(12) United States Patent
Wiemers

(10) Patent No.: US 7,204,625 B2
(45) Date of Patent: Apr. 17, 2007

(54) PHOTOTHERAPY DEVICE

(76) Inventor: Siegfried Wiemers, Breslauer Ring 18, D-38542 Leiferde (DE)

(*) Notice: Subject to any disclaimer, the term of this patent is extended or adjusted under 35 U.S.C. 154(b) by 169 days.

(21) Appl. No.: 11/080,309

(22) Filed: Mar. 15, 2005

(65) Prior Publication Data

US 2005/0207174 A1    Sep. 22, 2005

(30) Foreign Application Priority Data

Mar. 17, 2004  (DE) .................. 10 2004 012 922

(51) Int. Cl.
*F21W 101/02*  (2006.01)
(52) U.S. Cl. .................. 362/490; 362/544; 362/545
(58) Field of Classification Search ............... 362/490, 362/543, 544, 545, 243, 246
See application file for complete search history.

(56) References Cited

U.S. PATENT DOCUMENTS

2005/0013139 A1* 1/2005 Sugihara et al. ............ 362/490
2005/0185399 A1* 8/2005 Beermann et al. .......... 362/231

FOREIGN PATENT DOCUMENTS

DE          102 32 797         1/2004

* cited by examiner

*Primary Examiner*—Laura Tso
(74) *Attorney, Agent, or Firm*—Michael J. Striker

(57) ABSTRACT

A phototherapy device suitable for shining light on a vehicle driver (3) in order to suppress melatonin production and increase wakefulness, having at least one light fixture (1) located in the region of the head of the driver (3), is improved in terms of its freedom front glare, with undiminished effectiveness, in that the light fixture (1) is embodied to emit essentially nondirectional diffuse light (7) and is located outside the field of view of the driver (3), or at least in the peripheral region of his field of view.

11 Claims, 2 Drawing Sheets

PHOTOTHERAPY DEVICE

FIELD OF THE INVENTION

The invention relates to a phototherapy device for shining light on a vehicle driver, having at least one light fixture located in the region of the driver's head.

BACKGROUND OF THE INVENTION

It is known that a person's physiology and wellbeing can be influenced by phototherapy. In particular, the production of melatonin, which increases during darkness, can be reduced by the influence of light. Melatonin is a hormone that makes a person sleepy. Hence a relatively long period of darkness causes tiredness. Recent research shows that there is a nonvisual photopigment in the eye, in the ganglial cells of the retina, which in phototherapy using relatively slight quantities of light causes suppression of melatonin production. The greatest biological effect is attained with blue light at a wavelength of approximately 464 nm. Incident radiation from a blue sky therefore is substantially more effective in suppressing melatonin production than artificial light from incandescent or fluorescent bulbs.

From German Patent Disclosure DE 102 32 797 A1, a device for enhancing vigilance of a driver of a vehicle is already known in which a source that emits electromagnetic waves is controlled as a function of the signals from a sensing device for detecting the degree of attentiveness on the part of the vehicle driver. The source that emits electromagnetic waves is either lights on the dashboard or the interior lighting of the vehicle. The known device has the disadvantage that the light source blinds the driver. This risk is especially high at night, because of course the surroundings of the driver and above all the road that the driver is supposed to observe is dark or only relatively weakly illuminated.

SUMMARY OF THE INVENTION

It is therefore the object of the present invention to disclose a phototherapy device of the type defined at the outset, with which the driver's alertness can be enhanced without blinding him.

This is attained according to the invention by providing that the light fixture is embodied as emitting substantially nondirectional diffuse light and is located outside or at least in the peripheral region of the field of view of the driver. Both of these provisions of the invention greatly reduce or entirely suppress the blinding effect, i.e., the glare.

In a preferred embodiment, the light fixture has at least one light fixture surface, which is offset upward at an elevation angle relative to the primary viewing direction of the driver. The greater the light-emitting surface area of the light fixture, the less the selected luminance can be for a given radiation capacity, further reducing the risk of blinding the driver. Because the light fixture surface is offset upward, the lower region of the eye that is especially sensitive in suppressing melatonin production is especially effectively illuminated. The term light fixture surface is understood here to mean any outlet opening of the light fixture, whether it has a flat, curved, or otherwise-shaped covering. The term primary viewing direction of the vehicle driver is usually understood to mean the travel direction of the vehicle.

If the light fixture surface is located above an elevation angle of approximately 40° relative to the primary viewing direction of the driver, then the glare is largely suppressed, and the phototherapy effect is optimized.

Since the phototherapy effect when light is shone on the vehicle driver from behind or even vertically from above is negligible, it is recommended in a feature of the invention that the light fixture surface, relative to the primary viewing direction of the driver, extends over an elevation angle range extending from at least 40° to at most 80°, preferably from 45° to 65°. By the limitation to the angular ranges named, the size of the light fixture can be kept within economically feasible limits, without sacrifices in the intended phototherapy effect.

This is also true in terms of the limitation of the lateral length of the light fixture, namely if, in a feature of the invention, the light fixture surface, relative to the primary viewing direction of the driver, extends from top left to top right over a wide angle range of at least 40°.

In a preferred embodiment, the light fixture is mounted on the ceiling of the vehicle, and as a result the aforementioned angular ranges can be attained in the simplest possible way.

The effectiveness of the phototherapy in terms of suppressing melatonin production is improved still further by the provision that the light fixture is embodied to emit blue light, preferably at a wavelength of 464 nm.

With this kind of blue, diffuse illumination over a relatively large space angle range from above, a blue sky that is especially effective in suppressing melatonin production is simulated nearly perfectly.

A light fixture that is especially well suited for the phototherapy device of the invention has at least one light source and at least one diffusor which acts as a light fixture surface. The diffusor makes the light from the light source diffuse, and this light is simultaneously distributed over a relatively large light fixture surface. Both provisions reduce the glare. With only one light source, a relatively large light fixture surface can already be well illuminated. In practice, however, the light fixture preferably has a plurality of light sources, so that a relatively large light fixture surface becomes possible with only a relatively shallow housing for the light fixture.

In a feature of the invention, the diffusor is embodied as a translucent glass plate. This translucent glass plate can be manufactured simply and inexpensively.

In a preferred embodiment of the light fixture of the invention, blue light-emitting diodes which are distributed over the surface of the diffusor are provided as the light source.

In a feature of the light fixture of the invention, the light fixture surface or all of the light fixture surfaces have an elongated, preferably rectangular shape, with dimensions of from 5 to 10 cm in cross section and 10 to 30 cm in longitudinal section.

It is understood that the light fixture of the invention may also be composed of a plurality of small light fixture surfaces, instead of a single large one.

One exemplary embodiment of the invention is described in further detail below in conjunction with the drawings.

DESCRIPTION OF THE PREFERRED EMBODIMENT

Figure 1:
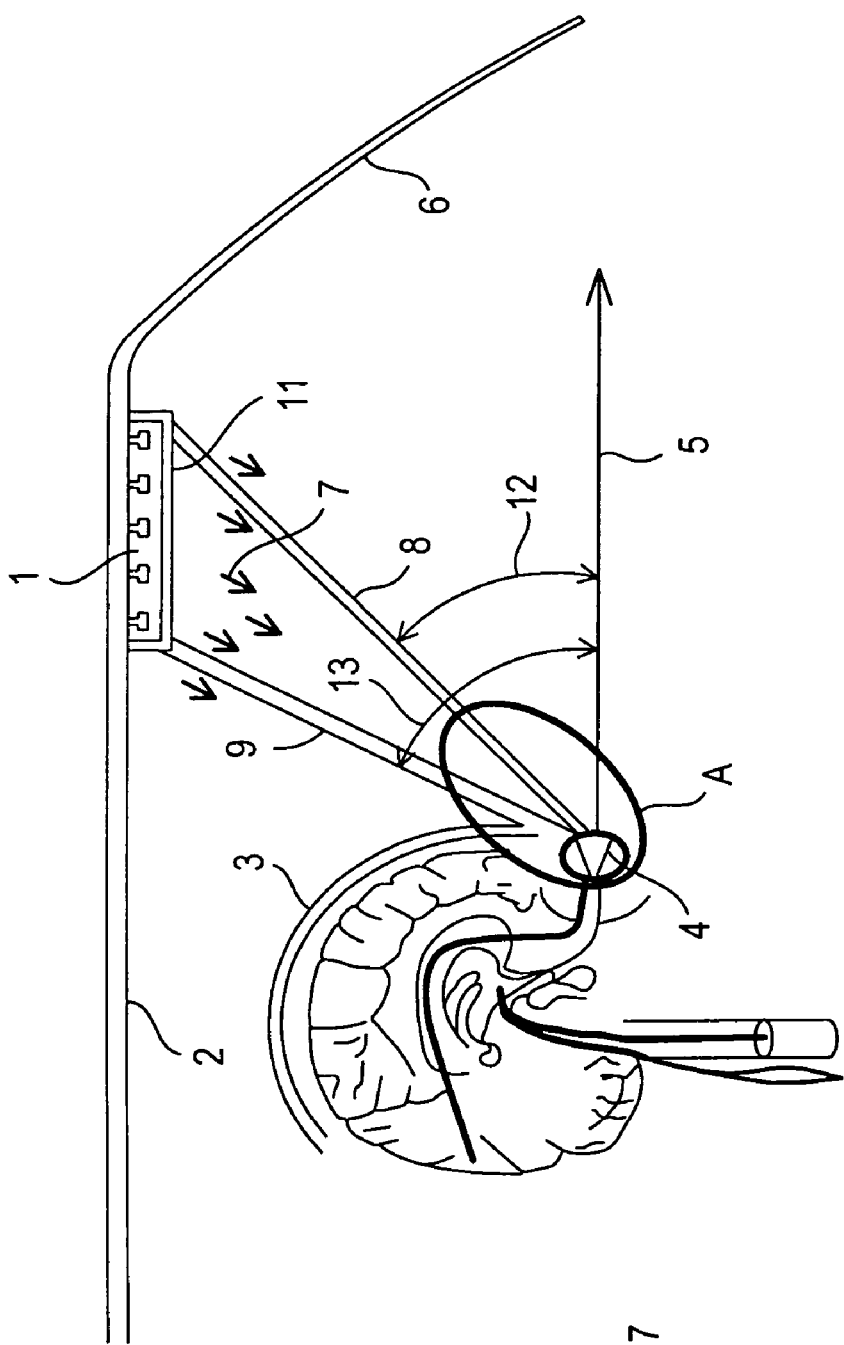
FIG. 1 shows a phototherapy device according to the invention in a motor vehicle, in a schematic basic sketch.

In FIG. 1, a light fixture 1 can be seen, which is mounted on a ceiling 2 of a motor vehicle, in the region of the head of a vehicle driver, of whom a section through his head 3 is shown symbolically. In normal forward travel of the vehicle, an eye 4 looks in the viewing direction 5 through the windshield 6. The light fixture 1 shines diffuse light 7 into the interior of the vehicle. In FIG. 1, a lower peripheral beam 8 and an upper peripheral beam 9 have been drawn in to demarcate a region from which the diffuse light 7 from the light fixture 1 falls into the eye 4 of the driver.

Figure 2:
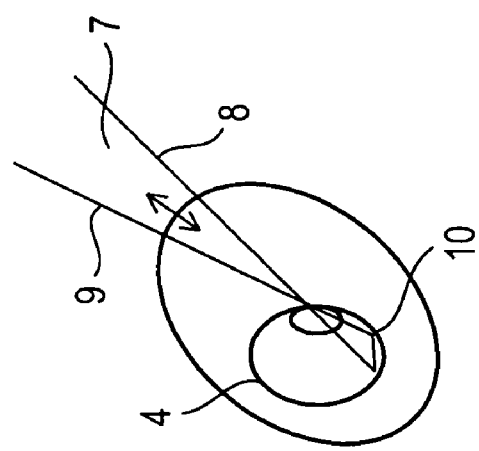
FIG. 2 is an enlarged detail A from FIG. 1.

As best seen in FIG. 2, in the eye 4 the light 7 defined by the peripheral beams 8 and 9 strikes a lower eye region 10, which has sensory cells that are responsible for regulating melatonin production. From the light fixture 1, the light 7 does not fall into the primary field of view of the driver, which in the view shown in FIG. 1 has its center in the viewing direction 5 and extends over a certain space angle range around the viewing direction 5.

An outer surface 11 of the light fixture 1, by its length in the travel direction, determines the angular range between the peripheral beams 8, 9 out of which range light falls into the eye 4. Relative to the primary viewing direction 5 of the vehicle driver, the light fixture surface 11 is shifted so far upward that the angular range defined by the peripheral beams 8, 9 is located outside the primary field of view of the vehicle driver. The angle 12 between the primary viewing direction 5 and the lower peripheral beam 8 has decisive significance here. It must be selected to be large enough that the light 7 from the light fixture 1 does not cause any glare. Care must therefore be taken that the light fixture surface 11 be located relative to the eye 4 of the vehicle driver in such a way that it is located entirely above an elevation angle 12 of approximately 40° relative to the primary viewing direction 5.

Since for economic reasons the surface 11 of the light fixture should not exceed a certain length, the result is an upper limit to the range of the elevation angle. An elevation angle 13 measured between the primary viewing direction 5 and the upper peripheral beam 9 thus represents an upper limit to the elevation angle range, which preferably extends between an elevation angle 12 of 40° to an elevation angle 13 of 80°. Angles greater than 80° are in fact not required in this connection, because light from such a steep angle from above or even obliquely from behind can no longer reach the eye 4 of the driver and is therefore ineffective in terms of reducing melatonin production. The optimal range with respect to low glare and high effectiveness in terms of melatonin production is between a lower elevation angle 12 of 45° and an upper elevation angle 13 of 65°.

Analogously to the elevation angle range, there is also a widthwise angular range, which is determined by the dimensions of the light fixture surface 11 in the horizontal direction, crosswise to the travel direction of the vehicle. This dimension of the light fixture can likewise not be selected as arbitrarily large, for the sake of economy. If on the other hand, as shown in FIG. 1, the light fixture surface 11 is already offset upward, then the lateral length of the light fixture surface 11 toward the top left or top right cannot cause glare, since it does not strike the primary field of view of the driver. On the other hand, if the light fixture surface 11 is enlarged, for a given radiation output, glare is reduced since for a larger total area, the luminance can be reduced. A good compromise between the largest possible light fixture surface for reducing glare on the one hand and the need, for reasons of economy, for limiting the size of the light fixture is achieved if the light fixture surface extends out of sight of the driver from top left to top right over a widthwise angular range of approximately 40°.

Figure 3:
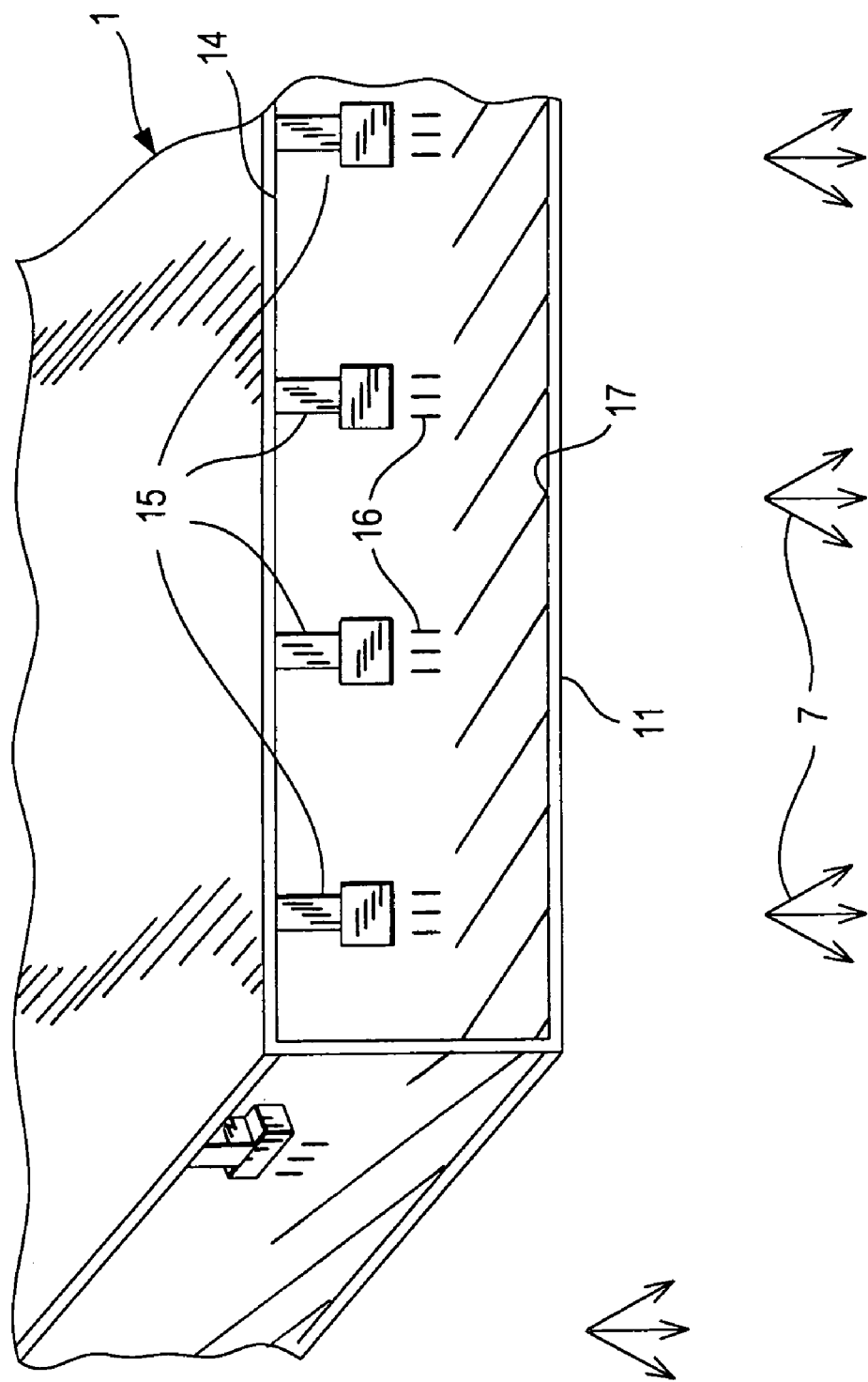
FIG. 3 shows the layout of a light fixture for a phototherapy device of the invention.

FIG. 3 shows the layout of a light fixture 1 of the invention. It comprises a substantially block-shaped housing 14, in which there are many blue light-emitting diodes 15. One beam 16 of relatively highly directional light falls from each of these light-emitting diodes onto a translucent glass plate 17, which serves as a lower covering for the housing 14. It is understood that the translucent glass plate may also be replaced by a light-scattering plastic plate.

The plate 17 acts as a diffusor, which converts the relatively directional beam 16 of light from the light-emitting diodes 15 into entirely diffuse light 7, which is emitted in all possible directions in space from the lower outer face of the plate 17, which thus forms the surface 11 of the light fixture 1.

Typically, a light fixture 1 of the invention has a block-shaped housing 14 of 5 to 10 cm in width, 10 to 30 cm in length, and approximately 1 cm in thickness, which can thus easily be mounted on the inside of the vehicle roof 2 in the region of the head of the vehicle driver.

The invention claimed is:

1. A phototherapy device for shining light on a vehicle driver (3). having at least one light fixture (1), located in the region of the head of the vehicle driver, wherein the light fixture (1) is embodied as emitting substantially nondirectional diffuse light (7) and is located outside or at least in the peripheral region of the field of view of the driver (3), wherein the light fixture (1) has at least one light fixture surface (11), which is offset upward at an elevation angle (12) relative to the primary viewing direction (5) of the driver (3) wherein the light fixture surface (11) is located outside an elevation angle (12) of approximately 40° relative to the primary viewing direction (5) of the driver (3).

2. A phototherapy device for shining light on a vehicle driver (3). having at least one light fixture (1), located in the region of the head of the vehicle driver, wherein the light fixture (1) is embodied as emitting substantially nondirectional diffuse light (7) and is located outside or at least in the peripheral region of the field of view of the driver (3), wherein the light fixture (1) has at least one light fixture surface (11), which is offset upward at an elevation angle (12) relative to the primary viewing direction (5) of the driver (3) wherein the light fixture surface (11), relative to the primary viewing direction (5) of the driver (3), extends over an elevation angle range that extends from at least 40° to at most 80°.

3. A phototherapy device for shining light on a vehicle driver (3). having at least one light fixture (1), located in the region of the head of the vehicle driver, wherein the light fixture (1) is embodied as emitting substantially nondirectional diffuse light (7) and is located outside or at least in the peripheral region of the field of view of the driver (3), wherein the light fixture (1) has at least one light fixture surface (11), which is offset upward at an elevation angle (12) relative to the primary viewing direction (5) of the driver (3), wherein the light fixture surface (11), relative to the primary viewing direction (5) of the driver (3), extends from top left to top right over a widthwise angular range of at least 40°.

4. The device as recited in claim 1 wherein the light fixture (1) is mounted on the ceiling (2) of the vehicle.

5. A phototherapy device for shining light on a vehicle driver (3), having at least one light fixture (1), located in the region of the head of the vehicle driver, wherein the light fixture (1) is embodied as emitting substantially nondirectional diffuse light (7) and is located outside or at least in the peripheral region of the field of view of the driver (3), wherein the light fixture (1) has at least one light fixture surface (11), which is offset upward at an elevation angle (12) relative to the primary viewing direction (5) of the driver (3) wherein the light fixture (1) is embodied to emit blue light.

6. A light fixture for a phototherapy device as recited in claim 1 wherein it has at least one light source (15) and at least one diffusor (17), the latter acting as the light fixture surface (11).

7. The light fixture as recited in claim 6, wherein the diffusor is a translucent glass plate (17).

8. The light fixture as recited in claim 6, wherein blue light-emitting diodes (15) which are distributed over the surface of the diffusor are provided as the light source.

9. The light fixture as recited in claim 6, wherein the light fixture surface (11) or all of the light fixture surfaces have an elongated, preferably rectangular shape, with dimensions of from 5 to 10 cm in cross section and 10 to 30 cm in longitudinal section.

10. The device as recited in claim 1, wherein the light fixture surface (11) relative to the primary viewing device (5) of the driver (2), extends over an elevation angle range that extends from a lower elevation angle (12) of 45° up to an upper elevation range (13) of 65°.

11. The device as recited in claim 1, wherein the light fixture is embodied to emit blue light at a wavelength of 464 nm.

* * * * *